United States Patent
Yamin, Sr. et al.

(10) Patent No.: US 12,349,782 B2
(45) Date of Patent: Jul. 8, 2025

(54) CYLINDRICAL ROTARY TIRE BRUSH ELEMENT WITH AN INTEGRATED WEAR INDICATOR

(71) Applicant: GALLOP BRUSH LLC, Imlay City, MI (US)

(72) Inventors: Theodore H. Yamin, Sr., Imlay City, MI (US); Theodore H Yamin, Jr., Imlay City, MI (US)

(73) Assignee: Gallop Brush LLC, Imlay City, MI (US)

( * ) Notice: Subject to any disclaimer, the term of this patent is extended or adjusted under 35 U.S.C. 154(b) by 172 days.

(21) Appl. No.: 17/469,212

(22) Filed: Sep. 8, 2021

(65) Prior Publication Data
US 2022/0312948 A1    Oct. 6, 2022

Related U.S. Application Data

(60) Provisional application No. 63/171,070, filed on Apr. 5, 2021.

(51) Int. Cl.
| | |
|---|---|
| *A46B 15/00* | (2006.01) |
| *A46B 3/08* | (2006.01) |
| *A46B 13/00* | (2006.01) |
| *A46B 13/02* | (2006.01) |
| *A46D 1/00* | (2006.01) |

(Continued)

(52) U.S. Cl.
CPC .............. *A46B 13/006* (2013.01); *A46B 3/08* (2013.01); *A46B 15/001* (2013.01); *A46D 1/0207* (2013.01); *B60S 3/042* (2013.01); *B60S 3/066* (2013.01); *A46B 13/02* (2013.01);
(Continued)

(58) Field of Classification Search
CPC ....... A46B 15/001; A46B 3/16; A46B 13/001; A46B 13/006; A46B 13/02; A46B 2200/3046; A46B 15/0002; A46B 13/005; A46B 7/10; A46D 1/02; A46D 1/0207;
(Continued)

(56) References Cited

U.S. PATENT DOCUMENTS

| | | | | |
|---|---|---|---|---|
| 2,754,531 | A | * | 7/1956 | Rowland .............. A46B 13/005 15/183 |
| 4,756,044 | A | * | 7/1988 | Clark ....................... A46B 7/10 15/207.2 |

(Continued)

*Primary Examiner* — Laura C Guidotti
(74) *Attorney, Agent, or Firm* — Thomas Heed; Heed Law Group

(57) ABSTRACT

The present invention, a cylindrical rotary tire brush element with an integrated wear indicator, is intended to replace the prior art cylindrical rotary tire brush element in a prior art rotary tire brush assembly. The cylindrical rotary tire brush element with integrated wear indicator is intended as a drop-in replacement to the prior art cylindrical rotary tire brush element of a prior art rotary tire brush assembly. The invention is made from at least two homogeneous pluralities of bristles, with each homogeneous plurality of bristles having the same purpose, material, color, and specified length. At least one plurality is a cleaning bristle of a first color and first specified length. At least one plurality is an indicator bristle of a second color and a third specified length, where the second color is a highly noticeable color such as yellow, red, orange, green, or white. The third specified length is equal to the minimum acceptable actual length of the cleaning bristles.

5 Claims, 8 Drawing Sheets

(51) Int. Cl.
   *B60S 3/04*   (2006.01)
   *B60S 3/06*   (2006.01)
   *A46D 3/00*   (2006.01)

(52) U.S. Cl.
   CPC ........ *A46B 2200/3046* (2013.01); *A46D 3/00* (2013.01); *B60S 3/06* (2013.01)

(58) Field of Classification Search
   CPC .. B60S 3/042; B60S 3/06; B60S 3/063; B60S 3/066
   USPC ... 15/207.2, 23, 53.2, 53.3, 53.4, 159.1, 160
   See application file for complete search history.

(56) References Cited

U.S. PATENT DOCUMENTS

| | | | | |
|---|---|---|---|---|
| 5,455,979 A | * | 10/1995 | Bores | A47L 11/302 15/207.2 |
| 2006/0272122 A1 | * | 12/2006 | Butler | A47L 9/0455 15/383 |

* cited by examiner

CYLINDRICAL ROTARY TIRE BRUSH ELEMENT WITH AN INTEGRATED WEAR INDICATOR

CLAIM OF PRIORITY

This non-provisional utility patent application claims priority to provisional patent application 63/171,070, filed Apr. 5, 2021, and entitled, "Rotary Tire Brush with an Integrated Wear Indicator".

FIELD OF INVENTION

The present invention relates to the classification for Servicing, Cleaning, Repairing, Supporting, Lifting, or Maneuvering of Vehicles Not Otherwise Provided for; and to one or more sub-classifications for Vehicle cleaning apparatus not integral with vehicles, for exteriors of land vehicles, with rotary bodies contacting the vehicles. Specifically, the present invention relates to a cylindrical rotary tire brush element with an integrated wear indicator

BACKGROUND OF INVENTION

Modern carwashes deploy a plurality of rotary brushes to remove dirt and debris from the exterior of motor vehicles. One common type of brush used in a carwash is a tire brush, used to remove dirt from the tire and wheel assembly of the vehicle. A tire brush is usually a stationary rotary brush. As the vehicle passes the tire brush, the cleaning bristles of the tire brush contact and clean the tire and wheel assembly.

The repetitive contact of the free ends of the carwash tire brush degrades the integrity of the cleaning bristles, regardless of the material from which they are fabricated. In use, the tips of the cleaning bristles are repetitively broken or sheered, resulting in a shortening of the cleaning bristles. Eventually, the cleaning bristles of the tire brush are shortened enough so as to become ineffective in performing their essential function of cleaning tires that pass by.

The maintenance and replacement of rotary tire brushes within the carwash environment is strictly manual and subjective. Carwash personnel need to routinely inspect the rotary tire brush and make an informed decision about whether the cleaning bristles of a particular tire brush assembly are worn and need to be replaced. A person or persons will often walk through the carwash on a daily or hourly basis, inspecting the various machines for signs of wear. Due to the incremental nature of the bristle degradation, a profound change in the cleaning bristle length is rarely seen upon routine inspection. In carwash operations with more sophisticated preventive maintenance regimes, a measurement of cleaning bristle length may be made before the start of each business day. If the cleaning bristles are too short, the brush element of the tire brush assembly is replaced.

What the market needs is a better way for assessing whether the cleaning bristle on a tire brush have reached an end-of-service-life condition. What the market needs is a cylindrical rotary tire brush element with a readily recognizable wear indicator, that does not harm the vehicle, or degrade the effectiveness of the brush.

SUMMARY OF INVENTION

This summary is intended to disclose the present invention, a cylindrical rotary tire brush element with an integrated wear indicator, intended for use within a carwash. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. The present invention is novel with respect to the prior art, and can be distinguished from the prior art.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size, and orientation of aspects of the present invention, a cylindrical rotary tire brush element with an integrated wear indicator. The terminology includes the words above specifically mentioned, derivatives thereof, and words of similar import.

A traditional rotary tire brush assembly used in a carwash is comprised of a cylindrical rotary tire brush element; at least two spindles; at least two bearings; a rotary motor; and a power source. One or more couplers may be used to connect multiple cylindrical rotary tire brush elements with or without using additional spindles and bearings.

The cylindrical rotary tire brush element is populated with a plurality of bristles. The bristles can be fabricated from a large number of natural and synthetic materials. Natural materials include animal hair such as hog's hair or horse hair. Natural materials also include plant fibers such as tampico, bassine, palmetto, and palmyra. Synthetic fibers used in carwash tire brush bristles include nylon, polyester ("PE"), polypropylene ("PP"), polyvinyl chloride ("PVC"), polystyrene ("PS"), polytetrafluoroethylene ("PTFE"), high-density polyethylene ("HDPE"), polyether ether ketone ("PEEK").

This application deals with several distinct pluralities of bristles, with each plurality being homogeneous with regards to purpose, material, color, and specified length. For the sake of clarity, the pluralities of bristles will be categorized by their purpose, their color, and their specified length. This application will discuss cleaning bristles and indicator bristles. This application will also discuss the color of bristles. This application will also discuss the specified length of bristles. So, for example, this application will discuss a first plurality of cleaning bristles of a first color and first specified length. Here, the first specified length refers to the length of the cleaning bristles of the cylindrical rotary tire brush element when the cylindrical rotary tire brush element is new. In use, the bristles will degrade, and the overall length of the individual bristles will decrease, as the tips shear off in use. The actual length of a cleaning bristle at a given point in time will be referred to as the actual length. Since cleaning bristles are almost always black, unless otherwise stated, the first color is black.

The present invention, a cylindrical rotary tire brush element with an integrated wear indicator, is intended to replace the cylindrical rotary tire brush element in a prior art rotary tire brush assembly. The cylindrical rotary tire brush element with integrated wear indicator is intended as a drop-in replacement to the cylindrical rotary tire brush element of the currently used, prior art rotary tire brush assemblies.

To properly understand the present invention, it is necessary to understand the prior art. In a first embodiment, the prior cylindrical rotary tire brush element is comprised of a cylindrical body having a first end and a second end; and a plurality of cleaning bristles of a first color and a first specified length. The bristles of the plurality of cleaning bristles of a first color and a first specified length have a uniform first specified length. The plurality of cleaning bristles of a first color and a first specified length extend outward from the cylindrical body.

There are many ways to attach bristles to a cylindrical body. This application will discuss one common method of doing so, which will also form part of the method claims of this patent. The raw bristles are wrapped around a retention body and are inserted into a u-channel. The open edges of the u-channel are crimped thereby capturing the bristles in the u-channel. The u-channel is wrapped around the cylindrical body in a tight helix. The u-channel is usually affixed to the cylindrical body at each end with a weld or a similar method of permanently affixing the u-channel to the cylindrical body. The u-channel is populated with sufficient bristles so as to fully populate the cylindrical outer surface of the cylindrical body. The cylindrical body is typically made from a durable metal such as steel, stainless steel, or aluminum.

In use, a prior rotary tire brush assembly rotates at a high speed. The contact of the plurality of cleaning bristles of a first color and a first specified length with the tire and rim cause the tips of the bristles of the plurality of cleaning bristles of a first color and first specified length to fatigue and break over time. This degrades the overall performance of the rotary tire brush assembly. There is a minimum acceptable actual length for the cleaning bristle at which the plurality of cleaning bristles is effective in its essential function of cleaning tires. Eventually, the actual length of the bristles of the plurality of cleaning bristles has been degraded through repetitive contact such that they are, on average, no longer meeting the minimum acceptable actual length for the cleaning bristle. At this point, the cylindrical rotary tire brush element needs to be replaced because it is no longer effective.

In a second embodiment of the prior art, a prior art cylindrical rotary tire brush element has several additional pluralities of cleaning bristles of a first color. These additional pluralities of cleaning bristles of a first color tend to come in two specified lengths. The pluralities of cleaning bristles are arranged, lengthwise down the cylindrical body in an alternating sequence. For example, starting at a first end, there will be a first plurality of cleaning bristles of a first color and a first specified length followed by a first plurality of cleaning bristles of a first color and a second specified length followed by a second plurality of cleaning bristles of a first color and a first specified length followed by a second plurality of cleaning bristles of a first color and a second specified length followed by a third plurality of cleaning bristles of a first color and a first specified length followed by a third plurality of cleaning bristles of a first color and a second specified length, continuing in this alternating, sequential fashion until the entire cylindrical body is populated. This type of cylindrical rotary tire brush element is sometimes referred to as a stepped wheel brush. The cylindrical rotary tire brush element of a stepped wheel brush may have over a dozen distinct pluralities of cleaning bristles of a first color and a first specified length alternating with over a dozen distinct pluralities of cleaning bristles of a first color and a second specified length. For sake of reference, the first specified length will be considered longer than the second specified length in this application. Clearly, this designation is arbitrary and is not intended to be limiting.

In use, a prior art rotary tire brush assembly rotates at a high speed. The contact of the pluralities of cleaning bristles of a first color and a first specified length with the tire and rim cause the tips of the bristles of the pluralities of cleaning bristles of a first color and first specified length to fatigue and break over time. The pluralities of cleaning bristles of a first color and first specified length tend to degrade before the pluralities of cleaning bristles of a first color and a second specified length, because the longer length bristles tend to hit the tires and rims to be cleaned with more force. There is a first minimum acceptable actual length at which the first plurality of cleaning bristles of a first color and first specified length is effective in cleaning tires. Eventually, the actual length of the bristles of the first plurality of cleaning bristles of a first color and a first specified length has been degraded through repetitive contact such that they are, on average, no longer meeting the first minimum acceptable actual length for the cleaning bristle. At this point, the cylindrical rotary tire brush element should be replaced.

Likewise, the contact of the pluralities of cleaning bristles of a first color and a second specified length with the tire and rim cause the tips of the bristles of the pluralities of cleaning bristles of a first color and second specified length to fatigue and break over time. Although the pluralities of cleaning bristles of a first color and first specified length tend to degrade before the pluralities of cleaning bristles of a first color and a second specified length, damaged tire rims can sometimes abnormally and prematurely degrade the pluralities of cleaning bristles of a first color and a second specified length. There is a second minimum acceptable actual length at which the pluralities of cleaning bristles of a first color and second specified length are effective in cleaning tires. If the actual length of the bristles of the pluralities of cleaning bristles of a first color and a second specified length has been degraded through repetitive contact such that they are, on average, no longer meeting the second minimum acceptable actual length for the cleaning bristle, the cylindrical rotary tire brush element should be replaced.

Currently, there is no good way to assess the length of the cleaning bristles of a first color and a first specified length, or the cleaning bristles of a first color and a second specified length, other than powering the equipment off and measuring the actual length of the cleaning bristles with a ruler.

The present invention is a cylindrical rotary tire brush element in which there is inserted at least a first plurality of indicator bristles having a second color and a third specified length. Most commonly, the pluralities of cleaning bristles of a first color are black. If the pluralities of cleaning bristles are black, it works best to arrange the first plurality of indicator bristles of a second color and a third specified length into a narrow radial band. The second color should be a bright color such as yellow, orange, green, or red.

Material selection for the bristles is important here. The color of the indictor bristles should be embedded within the material, not merely applied after the bristle is fabricated, such as painting. The indicator bristles cannot mark or discolor the vehicle tires in any way. As a result, the indicator bristles will be extruded from a material consisting essentially a polymer selected from a list of PE, PP, and nylon, together with a colorant. In other words, the indicator bristles may be PE; PP; nylon; or a composition of PE-PP; PE-nylon; PP-nylon; or PE-PP-nylon. The colorant, such as yellow or red, is embedded in the bristle material prior to its extrusion. In this way, the material will not mark the tires of the vehicle. From an economic perspective, the cleaning bristles can be made from the same materials with the addition of a black colorant, so that the extruded cleaning bristles are black.

The cylindrical rotary tire brush element of the rotary tire brush with an integrated wear indicator is comprised of a cylindrical body having a cylindrical surface, a first end, a second end, at least a first plurality of cleaning bristles of a first color and a first specified length; and at least a first plurality of indicator bristles having a second color and a third specified length arranged around and attached to the cylindrical body, which act as a wear indicator. The first plurality of cleaning bristles of a first color and a first specified length and the first plurality of indicator bristles of a second color and a third specified length are tightly packed and cover almost the entirety of the cylindrical body. The first plurality of indicator bristles having a second color and third specified length are typically arranged in a narrow radial band.

In a first embodiment, the first plurality of cleaning bristles of a first color and a first specified length are longer in length than the first plurality of indicator bristles of a second color and a third specified length. In other words, the first specified length is greater than the third specified length. The first plurality of cleaning bristles of a first color and first specified length have a first minimum acceptable actual length for the bristles. The length of the first plurality of indicator bristles of a second color and third specified length are equal in length to the first minimum acceptable actual length of the first plurality of cleaning bristles of a first color and a first specified length. In use, as the first plurality of cleaning bristles of a first color and first specified length contact tires and rims, the bristles will repetitively shear a small amount of material off of their tips. As the actual length of the first plurality of cleaning bristles of a first color and first specified length diminishes with use, the first plurality of indicator bristles of a second color and a third specified length becomes more pronounced. When the bristles of the first plurality of cleaning bristles of a first color and a first specified length are equal in length to the length of the first plurality of indicator bristles of a second color and a third specified length, it is time to change the cylindrical rotary tire brush element. In other words, the third specified length is equal to the first minimum acceptable actual length.

The bristles of the first plurality of cleaning bristles of a first color and first specified length are typically black or charcoal gray. Cleaning bristles of a first color make up the vast majority of bristles in the present invention. The first plurality of indicator bristles of a second color and third specified length are bright yellow in color. In an alternative embodiment, the second color can be bright red. In yet another alternative embodiment, the second color can be bright orange. In yet another alternative embodiment, the second color can be a bright green. In yet another alternative embodiment, the second color can be white. Although the second color could conceivable be blue, purple, or brown, these colors do not work as well from a visual contrast point of view. Additionally, white can be problematic if the tint of the water used in the rotary tire brush assembly is dirty or gray.

In a second major embodiment, the present invention can be applied to a stepped wheel brush. In this embodiment, the cylindrical rotary tire brush element with an integrated wear indicator has several additional pluralities of cleaning bristles of a first color. These additional pluralities of cleaning bristles of a first color tend to come in two specified lengths. The pluralities of cleaning bristles are arranged, lengthwise down the cylindrical body in an alternating sequence. For example, starting at a first end, there will be a first plurality of cleaning bristles of a first color and a first specified length followed by a first plurality of cleaning bristles of a first color and a second specified length followed by a second plurality of cleaning bristles of a first color and a first specified length followed by a second plurality of cleaning bristles of a first color and a second specified length followed by a third plurality of cleaning bristles of a first color and a first specified length followed by a third plurality of cleaning bristles of a first color and a second specified length, continuing in this alternating, sequential fashion until the entire cylindrical body is populated. At least one plurality of indicator bristles of a second color and a third specified length is interposed between at least one plurality of cleaning bristles of a first color and a first specified length and at least one plurality of cleaning bristles of a first color and a second specified length.

In a third major embodiment of the present invention, also applied to a stepped wheel brush, the arrangement of a stepped wheel brush is altered a little. In this embodiment, starting at a first end of the cylindrical body, there will be a first plurality of cleaning bristles of a first color and a first specified length followed by a first plurality of indicator bristles of a second color and a third specified length followed by a second plurality of cleaning bristles of a first color and first specified length, followed by a first plurality of cleaning bristles of a first color and a second specified length. This arrangement would be repeated until the entire cylindrical body is populated with bristles. In this way, the indicator bristles are nested within the pluralities of the cleaning bristles of the first color and first specified length. The indicator bristles are arranged in a narrow, radial band.

The present invention can be generalized so that there is at least a first plurality of cleaning bristles of a first color and a first specified length and at least a first plurality of indicator bristles of a second color and third specified length, wherein the number of pluralities of cleaning bristles of a first color is always greater than or equal to the number of plurality of indicator bristles of a second color. The pluralities of indicator bristles of a second color can be positioned at the ends of the cylindrical rotary brush or they can be interposed between the pluralities of cleaning bristles of a first color. However, placing indicator bristles at the end of the cylindrical rotary tire brush element robs the invention of its visual impact and is typically to be avoided.

In the present invention, the bristles are affixed to a cylindrical body. The cylindrical body of the cylindrical rotary tire brush element with integrated wear indicator has a fitting at either end so that it may be attached to a tire brush machine. The cylindrical body is positioned in the tire brush machine so that the axis of the cylindrical body is parallel with the direction of motion of the vehicle through the carwash.

BRIEF DESCRIPTION OF THE DRAWINGS

The present invention is illustrated with 11 figures on 8 sheets. The accompanying drawings are incorporated in and constitute a part of this disclosure. The figures are intended to illustrate various embodiments of the invention. The present invention is a cylindrical rotary tire brush element with an integrated wear indicator.

DETAILED DESCRIPTION

This description is intended to disclose the present invention, a cylindrical rotary tire brush element with an integrated wear indicator. The cylindrical rotary tire brush element with integrated wear indicator is intended to be a drop-in replacement in a prior art rotary tire brush assembly for a prior art cylindrical rotary tire brush element. This description is not intended to limit the scope of the claimed subject matter. Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size, and orientation of aspects of the present invention, a rotary tire brush with an integrated wear indicator. The terminology includes the words above specifically mentioned, derivatives thereof, and words of similar import. Once a numbered element is described within this Detailed Description, it may be referred to with respect to other figures.

A prior art rotary tire brush assembly used in a carwash is comprised of a cylindrical rotary tire brush element; at least two spindles; at least two bearings; a rotary motor; and a power source. One or more couplers may be used to connect multiple cylindrical rotary tire brush element using additional spindles and bearings.

The present invention, a cylindrical rotary tire brush element with an integrated wear indicator, is intended to replace the prior art cylindrical rotary tire brush element in a prior art rotary tire brush assembly. The cylindrical rotary tire brush element with integrated wear indicator is intended as a drop-in replacement to the prior art cylindrical rotary tire brush element of a prior art rotary tire brush assembly.

Figure 1:
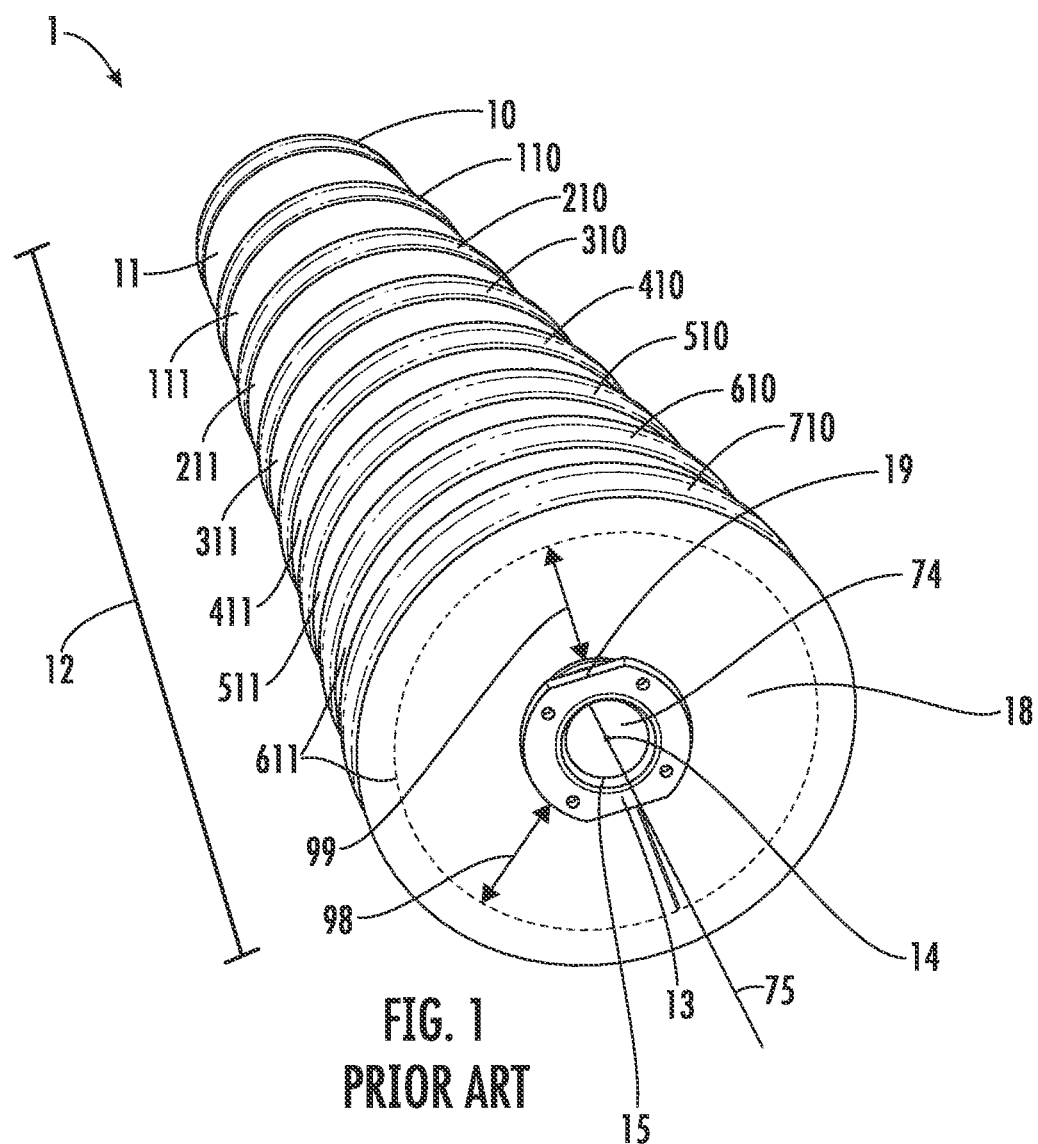
FIG. 1 is a perspective view of a first embodiment of a prior art cylindrical rotary tire brush element, also known as a stepped wheel brush element.
Figure 2:
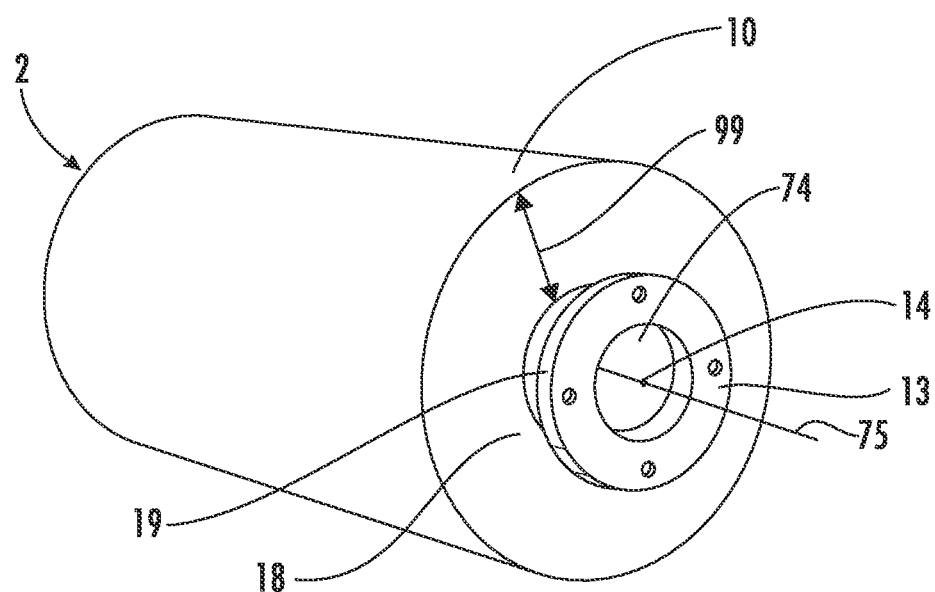
FIG. 2 is a perspective view of a second prior art rotary cylindrical rotary tire brush element.

FIGS. 1-2 show a first 1 and a second 2 embodiment of a prior art cylindrical rotary tire brush element 1, 2 used in a prior art rotary tire brush assembly. Referring first to FIG. 2, the second embodiment of the prior art cylindrical rotary tire brush element 2 is comprised of a cylindrical body 19, a first end 18, and a second end (second end is obverse to first end and cannot be seen in perspective view of FIG. 2). A plurality of cleaning bristles 10 of a first color and a first specified length 99 are densely arranged on the cylindrical body 19. The first end 18 has a collar 13 with an opening 74 into which a spindle of a prior art tire brush assembly can fit. The prior art cylindrical rotary tire brush element 2 spins about its axis 75 in use, the axis 75 passing through the center 14 of the opening 74 into which the spindle fits.

In FIG. 1, the first embodiment of the prior art cylindrical rotary tire brush element 1 is comprised of a cylindrical body 19 having a first end 18 and a second end (second end is obverse to first end and cannot be seen in perspective view of FIG. 1); pluralities of cleaning bristles 10, 110, 210, 310, 410, 510, 610, 710 of a first color and first specified length 99, and pluralities of cleaning bristles 11, 111, 211, 311, 411, 511, 611 of a first color and a second specified length 98. The first end 18 has a collar 13 with an opening 74 that acts as a receiver into which a spindle of a prior art rotary tire brush assembly can fit. The prior art cylindrical rotary tire brush element spins on its axis 75, the axis 75 passing through the center 14 of the opening 74 into which the spindle fits.

Figure 3:
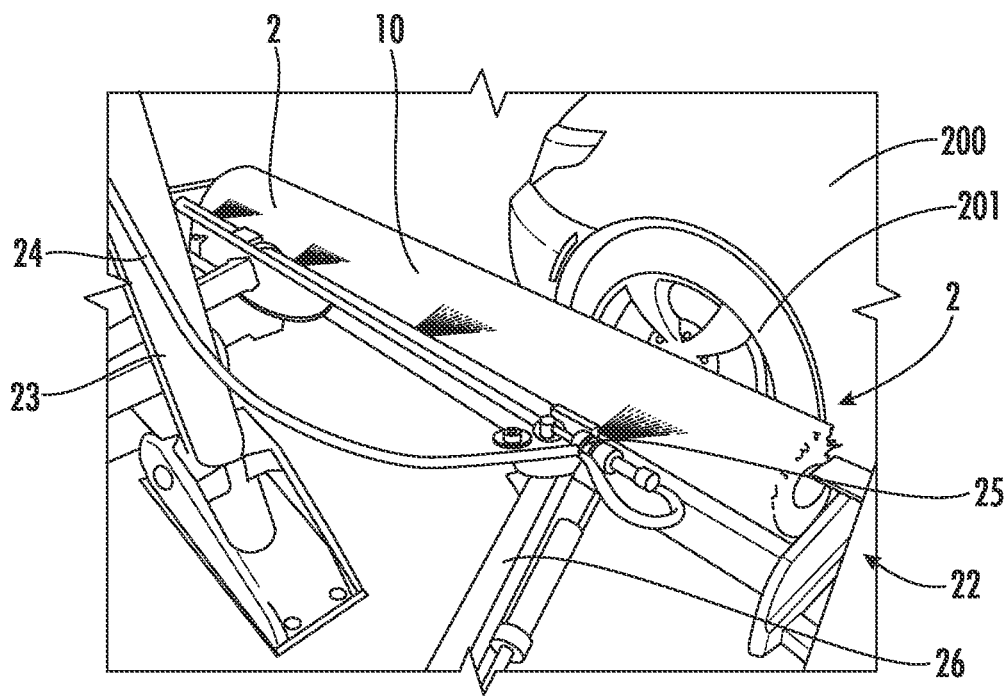
FIG. 3 is a perspective view a prior art rotary tire brush assembly using the second embodiment of the prior art cylindrical rotary tire brush element.
Figure 4:
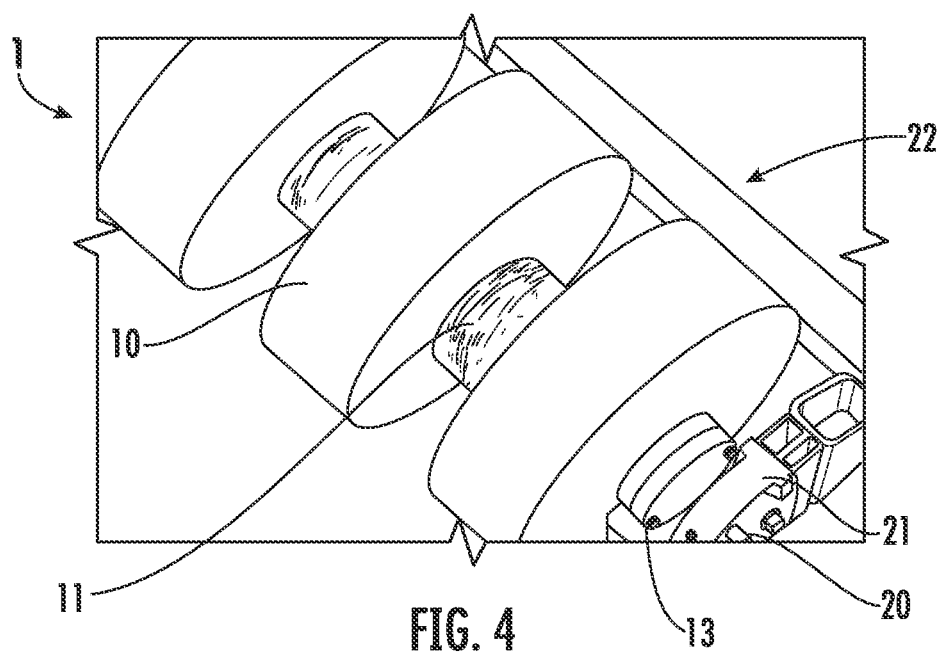
FIG. 4 is a perspective view of a prior art rotary tire brush assembly using the first embodiment of the prior art cylindrical rotary tire brush element.

In FIGS. 3 and 4, the first 1 and second 2 embodiments of a prior art cylindrical rotary tire brush element 1, 2 are shown, in situ, in a rotary tire brush assembly 22. In FIG. 3, the second embodiment 2 of a prior art cylindrical rotary tire brush element 2 is shown in a rotary tire brush assembly 22 cleaning the tires 201 of a vehicle 200. There is a plurality of cleaning bristles 10 of a first color and first specified length 99. The rotary tire brush assembly 22 has vertical supports 26, horizontal supports 23, feed hoses 24, and sprayers 25. FIG. 4 shows the first embodiment 1 of a prior art cylindrical rotary tire brush element 1, a stepped wheel brush element 1, in situ, in a rotary tire brush assembly 22. There are pluralities of cleaning bristles 10 of a a first color and first specified length 99 and cleaning bristles 11 of a first color and a second specified length 98. In this view, the collar 13 is visibly attached to the spindle 20, which is supported by a bearing 21.

Figure 5:
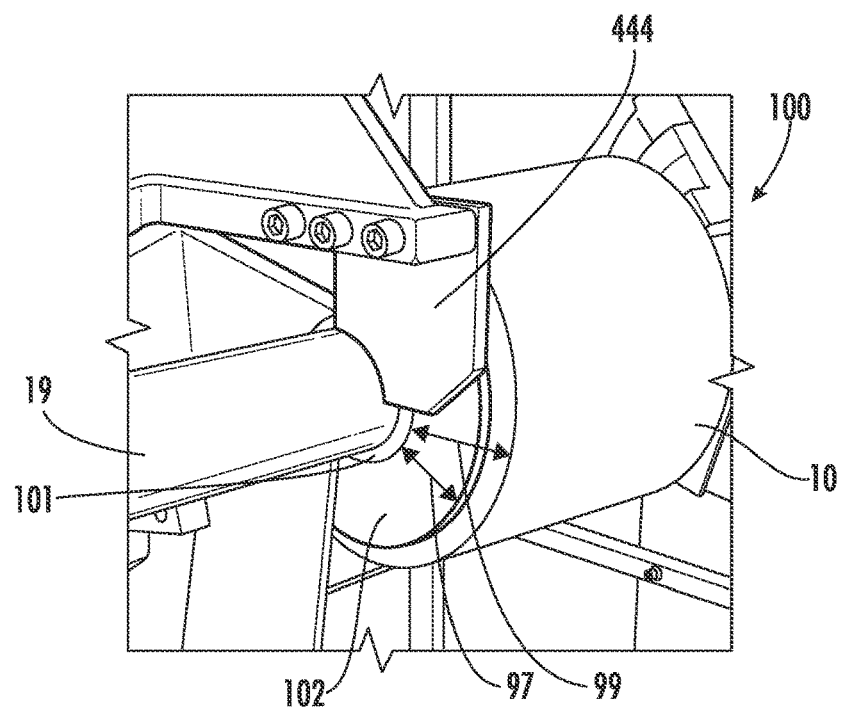
FIG. 5 is a perspective view of a cylindrical rotary tire brush element with an integrated wear indicator being fabricated.

FIG. 5 shows the present invention 100, a cylindrical rotary tire brush element with integrated wear indicator 100, in the process of being fabricated. This view is illustrative of the construction of the present invention 100. The cylindrical body 19 is partially populated and exposed. A first plurality of cleaning bristles 10 of a first color and first specified length 99 have been added. A first plurality of indicator bristles 102 of a second color and third specified length 97 has been added. The u-channel 101 in which the bristles 10, 102 are captured is wrapped in a tight helix about the cylindrical body 19. A retaining guard 444 keeps the u-channel 101 and bristles 10, 102 in position, making for densely compacted bristles 10, 102.

Figure 6:
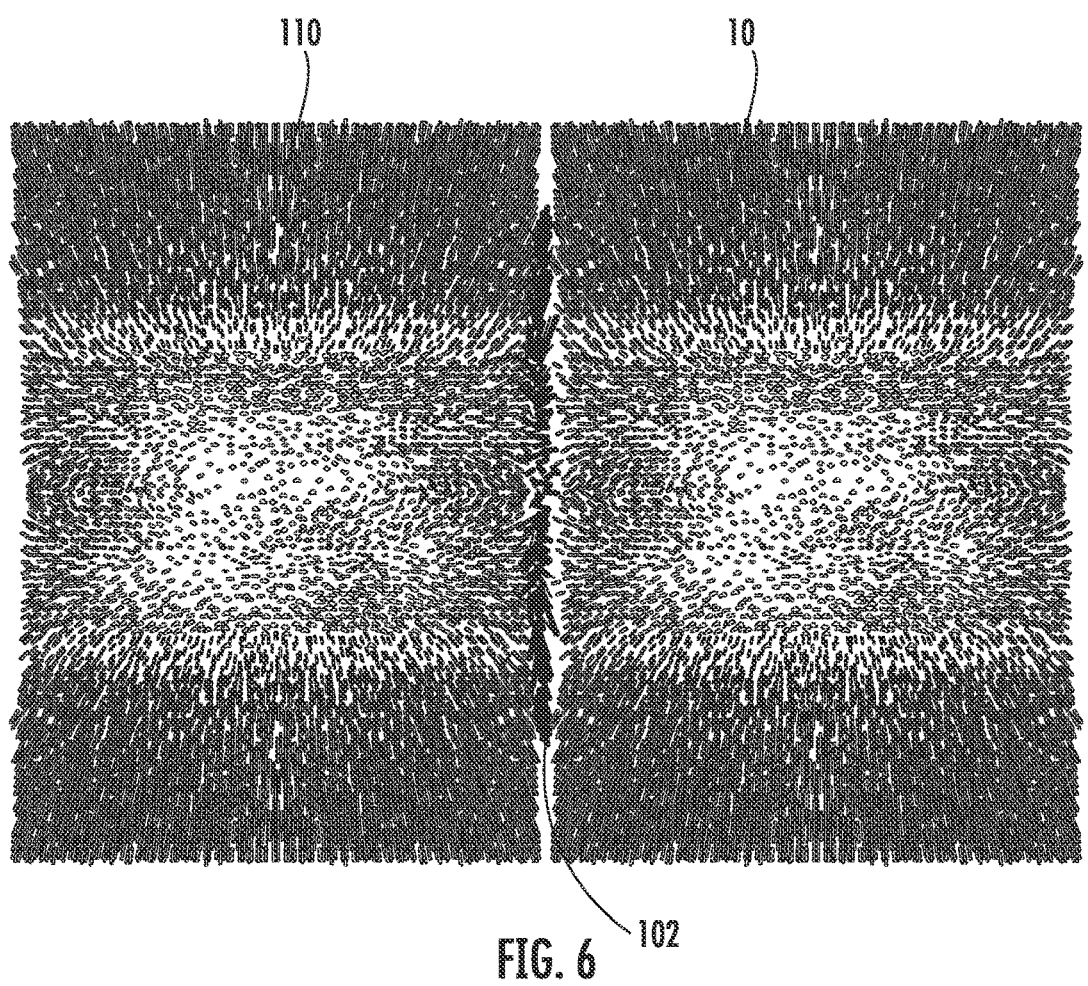
FIG. 6 is a close-up showing a plurality of indicator bristles arranged in a narrow band, nestled between a first plurality of cleaning bristles and a second plurality of cleaning bristles.

FIG. 6 shows a front isolation of the present invention 100, with a first plurality of cleaning bristles 10 of a first color and first specified length 99, a second plurality of cleaning bristles 110 of a first color and a first specified length 99, and a first plurality of indicator bristles 102 of a second color and a third specified length 97. The plurality of indicator bristles 102 of a second color and a third specified length 97 is arranged in a narrow band and is nested between the two pluralities of cleaning bristles 10, 110. In use, the first plurality of cleaning bristles 10 of a first color and first specified length 99 and the second plurality of cleaning bristles 110 of a first color and first specified length 99 would wear at approximately the same rate, slowly losing length due to repetitive contact with the tires of vehicles. When the actual length of the first plurality of cleaning bristles 10 of a first color and first specified length 99 and the second plurality of cleaning bristles 110 of a first color and first specified length 99 is, on average, equal to the third specified length 97, that of the first plurality of indicator bristles 102 of a second color and a third specified length 97, the first plurality of indicator bristles 102 of a second color and a third specified length 97 will become highly visible indicating that replacement of the present invention 100 is required.

Material selection for the bristles is important here. The color of the indictor bristles 102 should be embedded within the material, not merely applied after the bristle 102 is fabricated, such as painting. The indicator bristles 102 cannot mark or discolor the vehicle 200 tires 201 in any way. As a result, the indicator bristles 102 will typically be extruded from a material consisting essentially a polymer selected from a list of PE, PP, and nylon, together with a colorant. In other words, the indicator bristles 102 may be PE; PP; nylon; or a composition of PE-PP; PE-nylon; PP-nylon; or PE-PP-nylon. The colorant, such as yellow or red, is embedded in the bristle 102 material prior to its extrusion. In this way, the material will not mark the tires 201 of the vehicle 200. From an economic perspective, the cleaning bristles 10, 11 can be made from the same materials with the addition of a black colorant, so that the extruded cleaning bristles 10, 11 are black.

The cylindrical rotary tire brush element with an integrated wear indicator 100 is comprised of a cylindrical body 19 having a cylindrical surface, a first end 18, a second end, at least a first plurality of cleaning bristles 10 of a first color and a first specified length 99; and at least a first plurality of indicator bristles 102 having a second color and a third specified length 97 arranged around and attached to the cylindrical body 19, which act as a wear indicator. The first plurality of cleaning bristles 10, 110 of a first color and a first specified length 99 and the first plurality of indicator bristles 102 of a second color and a third specified length 97 are tightly packed and cover almost the entirety of the cylindrical body 19. The first plurality of indicator bristles 102 having a second color and third specified length 97 are typically arranged in a narrow radial band.

Figure 7:
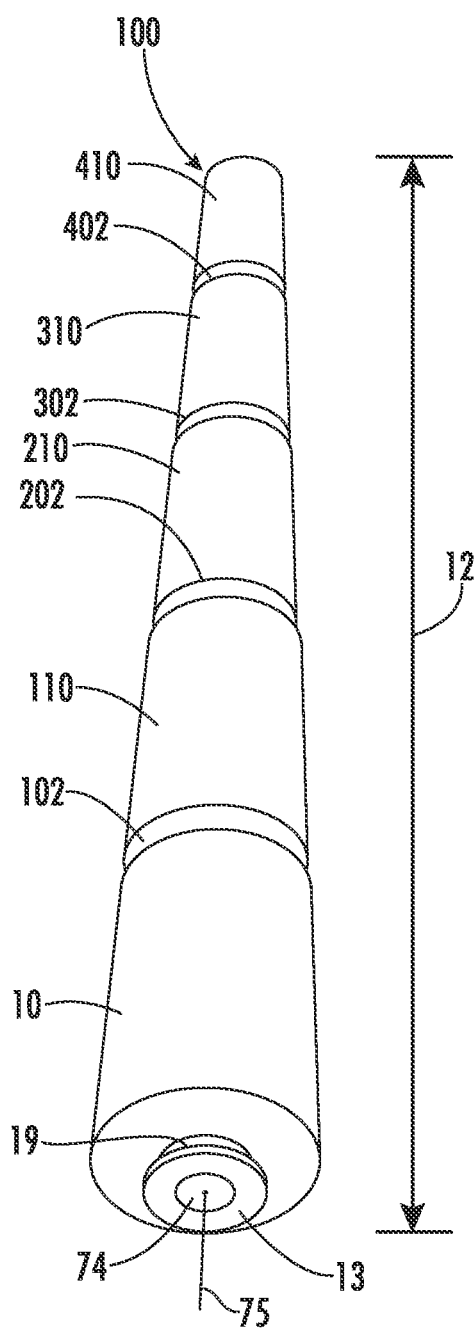
FIG. 7 is a perspective view of the present invention, a cylindrical rotary tire brush element with integrated wear indicators.

FIG. 7 is a perspective view of a representative first embodiment of the present invention, a cylindrical rotary tire brush element with integrated wear indicators 100. The present invention 100 has a length 12. Starting at the bottom of the figure, there is a collar 13 with an opening 74 to receive a spindle. The present invention 100 is designed to spin on its axis 75. Starting at the bottom of the figure, the present invention has a cylindrical body 19 populated with a first plurality of cleaning bristles 10 of a first color and a first specified length 99; followed by a first plurality of indicator bristles 102 of a second color and a third specified length 97; followed by a second plurality of cleaning bristles 110 of a first color and a first specified length 99; followed by a second plurality of indicator bristles 202 of a second color and a third specified length 97; followed by a third plurality of cleaning bristles 210 of a first color and a first specified length 99; followed by a third plurality of indicator bristles 302 of a second color and a third specified length 97; followed by a fourth plurality of cleaning bristles 310 of a first color and a first specified length 99; followed by a fourth plurality of indicator bristles 402 of a second color and a third specified length 97; followed by a fifth plurality of cleaning bristles 410 of a first color and a first specified length 99. The pluralities of indicator bristles 102, 202, 302, 402 are arranged in narrow bands nested between pluralities of cleaning bristles 10, 110, 210, 310, 410. This arrangement can be extended to create a cylindrical rotary tire brush element with integrated wear indicator 100 of any length 12. In the first embodiment of the present invention 100, the pluralities of cleaning bristles 10, 110, 210, 310, 410 of a first color and a first specified length 99 are longer in length than the pluralities of indicator bristles 102, 202, 302, 402 of a second color and a third specified length 97. In other words, the first specified length 99 is greater than the third specified length 97. The pluralities of cleaning bristles 10, 110, 210, 310, 410 of a first color and first specified length 99 have a first minimum acceptable actual length for the bristles 10, 110, 210, 310, 410. The length 97 of the first plurality of indicator bristles 102, 202, 302, 402 of a second color and third specified length 97 are equal in length to the first minimum acceptable actual length of the pluralities of cleaning bristles 10, 110, 210, 310, 410 of a first color and a first specified length 99. In use, as the pluralities of cleaning bristles 10, 110, 210, 310, 410 of a first color and first specified length 99 contact tires 201 and rims, the bristles 10, 110, 210, 310, 410 will repetitively shear, losing a small amount of material off of their tips. As the actual length of the pluralities of cleaning bristles 10, 110, 210, 310, 410 of a first color and first specified length 99 diminishes with use, the pluralities of indicator bristles 102, 202, 302, 402 of a second color and a third specified length 97 becomes more pronounced. When the bristles 10, 110, 210, 310, 410 of the pluralities of cleaning bristles 10, 110, 210, 310, 410 of a first color and a first specified length 99 are equal in actual length to the length of the pluralities of indicator bristles 102, 202, 302, 402 of a second color and a third specified length 97, it is time to change the cylindrical rotary tire brush element 100. In other words, the third specified length 97 is equal to the first minimum acceptable actual length.

The bristles 10, 110, 210, 310, 410 of the pluralities of cleaning bristles 10, 110, 210, 310, 410 of a first color and first specified length 99 are typically black or charcoal gray. Cleaning bristles 10, 110, 210, 310, 410 of a first color make up the vast majority of bristles in the present invention 100. The pluralities of indicator bristles 102, 202, 302, 402 of a second color and third specified length 97 are bright yellow in color. The pluralities of indicator bristles 102, 202, 302, 402 of a second color and third specified length 97 are arranged in narrow bands between the pluralities of 10, 110, 210, 310, 410 of a first color and first specified length 99. In an alternative embodiment, the second color can be bright red. In yet another alternative embodiment, the second color can be bright orange. In yet another alternative embodiment, the second color can be a bright green. In yet another alternative embodiment, the second color can be white. Although the second color could conceivable be blue, purple, or even brown, these colors do not work as well from a visual contrast point of view.

Figure 11:
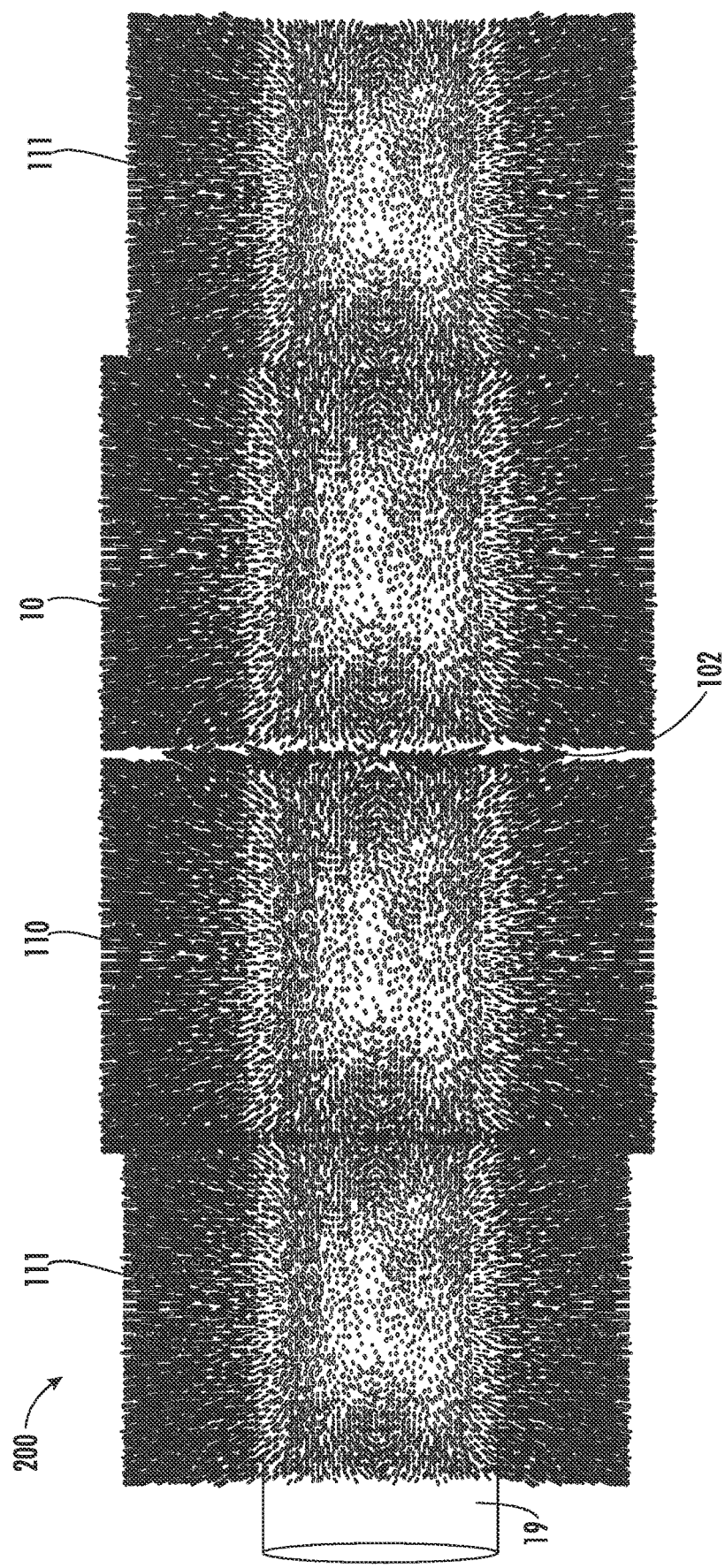
FIG. 11 is a close-up showing a plurality of indicator bristles arranged in a narrow band, nestled between a first plurality of cleaning bristles and a second plurality of cleaning bristles in a stepped wheel brush application.

FIG. 11 shows a second embodiment 200 of the present invention 200. Specifically, FIG. 11 shows the present invention 200 being applied to a stepped wheel brush 200. FIG. 11 shows a front isolation of the second embodiment of the present invention 200, with a first plurality of cleaning bristles 10 of a first color and first specified length 99; a second plurality of cleaning bristles 110 of a first color and a first specified length 99; a first plurality of indicator bristles 102 of a second color and a third specified length 97 arranged in a narrow band between the first plurality of cleaning bristles 10 of a first color and first specified length 99 and the second plurality of cleaning bristles 110 of a first color and a first specified length 99. To the right of the first plurality of cleaning bristles 10 of a first color and first specified length 99 is a first plurality of cleaning bristles 11 of a first color and a second specified length 98. To the left of the second plurality of cleaning bristles 110 of a first color and first specified length 99 is a second plurality of cleaning bristles 111 of a first color and a second specified length 98. In use, the first plurality of cleaning bristles 10 of a first color and first specified length 99 and the second plurality of cleaning bristles 110 of a first color and first specified length 99 would wear at approximately the same rate, slowly losing length due to repetitive contact with the tires of vehicles. When the actual length of the first plurality of cleaning bristles 10 of a first color and first specified length 99 and the second plurality of cleaning bristles 110 of a first color and first specified length 99 is, on average, equal to the third specified length 97, that of the first plurality of indicator bristles 102 of a second color and a third specified length 97, the first plurality of indicator bristles 102 of a second color and a third specified length 97 will become highly visible indicating that replacement of the present invention 100 is required. The tips of the pluralities of cleaning bristles 10, 110 of a first color and first specified length shear off before the tips of pluralities of cleaning bristles 11, 111 of a first color and a second specified length, because the first specified length 99 is longer than the second specified length 98. The various pluralities of cleaning bristles 10, 11, 110, 111 and indicator bristles 102 are homogeneous pluralities, meaning that all of the bristles of a plurality share a common purpose (cleaning or indicator), a common color, a common material, and a common specified length.

Figure 8:
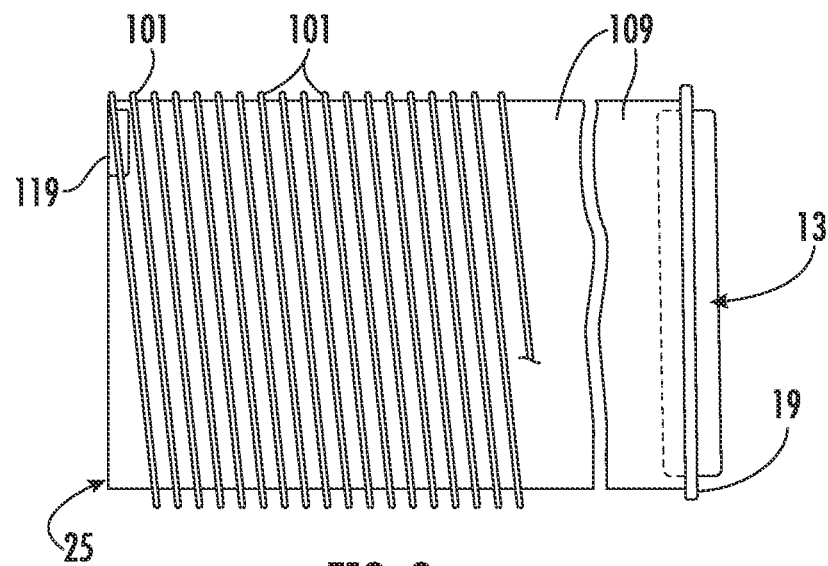
FIG. 8 is an isolation of a u-channel being wrapped around a cylindrical body.
Figure 9:
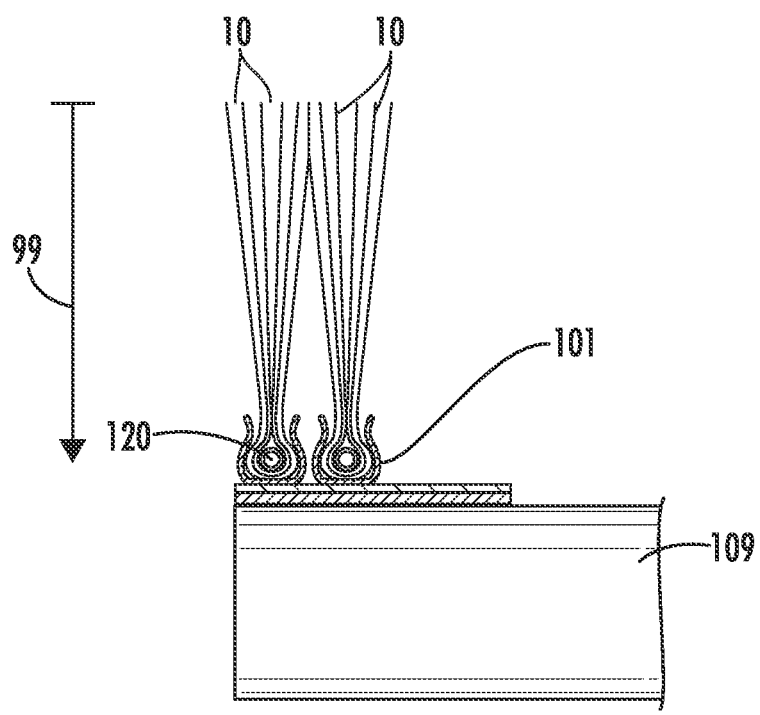
FIG. 9 is a front isolation of cleaning bristles captured in a u-channel and attached to a cylindrical body.
Figure 10:
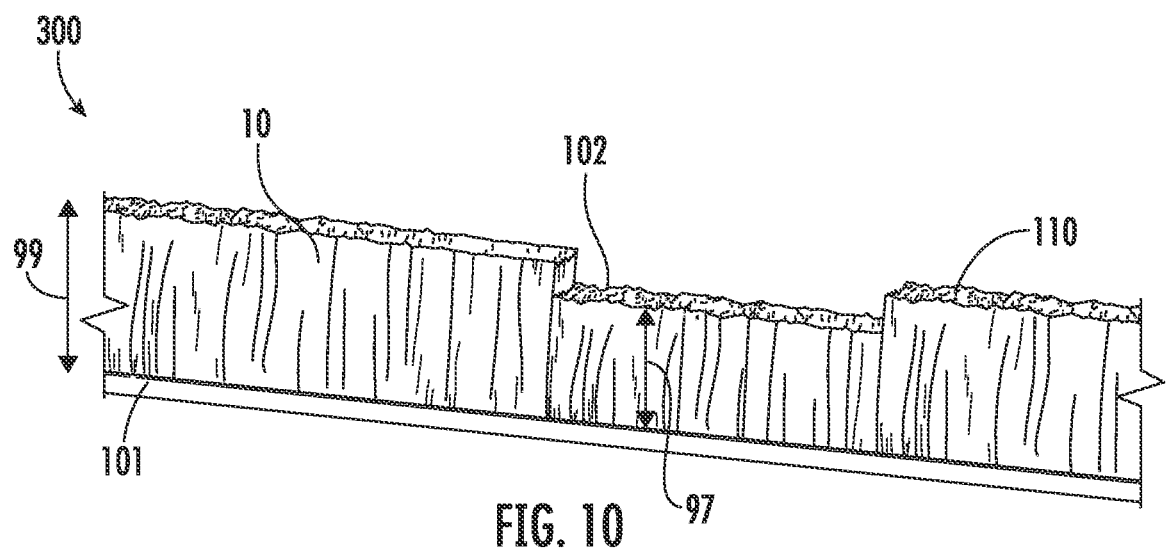
FIG. 10 is a u-channel populated with a first plurality of cleaning bristles, a first plurality of indicator bristles, and a second plurality of cleaning bristles.

FIGS. 8-10 show one common method for fabricating the present invention 100, 200. FIG. 8 shows a cylindrical body 19 to which is attached a u-channel 101 containing bristles. The u-channel 101 containing bristles is wrapped in a tight helix on the cylindrical outer surface 109 of the cylindrical body 19. The collar 13 of the cylindrical body 19 is also visible. The u-channel 101 is welded 119 to the cylindrical outer surface 109 at the edge 25 of the cylindrical outer surface 109.

FIG. 9 shows a cross-section view, showing the cylindrical outer surface 109 to which the u-channel 101 is attached. There are two successive turns of the tight helix visible in this view. The cleaning bristles 10 of a first color and first specified length 99 are captured in the u-channel 101 using a retention member 120. The u-channel 101 is crimped around the bristles 10 and retention member 120. The retention member 120 can be a fashioned using metal or polymers. The retention member 120 is a flexible cylinder which can be compressed when the u-channel 101 is crimped.

FIG. 10 shows an isolation of an assembly 300 comprised of a u-channel 101 containing a first plurality of cleaning bristles 10 of a first color and first specified length 99, followed by a first plurality of indicator bristles 102 of a second color and third specified length 97, followed by a second plurality of cleaning bristles 110 of a first color and first specified length 99. This assembly 300 is wrapped around the cylindrical outer surface 109 of the cylindrical body 19 in a tight helix, creating the present invention 100.

We claim:

1. A cylindrical rotary tire brush element with an integrated wear indicator comprising
    a cylindrical body;
    a u-channel;
    at least four homogenous pluralities of cleaning bristles of a first color and a first specified length;
    at least two homogenous pluralities of cleaning bristles of the first color and a second specified length;
    at least two homogenous pluralities of indicator bristles of a second color and a third specified length;
    wherein bristles are arranged in the u-channel by placing
        a first plurality of the at least four homogenous pluralities of cleaning bristles of a first color and a first specified length followed immediately by
        a first pluarlity of the at least two homogenous pluralities of indicator bristles of a second color and a third specified length followed immediately by
        a second plurality of the at least four homogenous pluralities of cleaning bristles of a first color and a first specified length followed immediately by
        a first plurality of the at least two homogenous pluralities of cleaning bristles of the first color and a second specified length followed immediately by
        a third plurality of the at least four homogenous pluralities of cleaning bristles of a first color and a first specified length followed immediately by
        a second pluarlity of the at least two homogenous pluralities of indicator bristles of a second color and a third specified length followed immediately by
        a fourth plurality of the at least four homogenous pluralities of cleaning bristles of a first color and a first specified length followed immediately by
        a second plurality of the at least two homogenous pluralities of cleaning bristles of the first color and a second specified length;
    wherein all of the homogeneous pluralities of bristles are captured in the u-channel and arranged as a densely wrapped helix on the cylindrical body, the cylindrical body having a cylindrical outer surface, an axis, a first end, and a second end, with the helix created by the wrapped u-channel and the homogenous pluralities of bristles extending from the first end to the second end;
    wherein each of the least two homogenous pluralities of indicator bristles of a second color and third specified length are arranged as a narrow, radial band in the u-channel nested between two pluralities of the at least four pluralities of cleaning bristles of a first color and a first specified length;
    wherein the first specified length is greater than both the second specified length and the third specified length;
    wherein there exists a minimum acceptable actual length for the at least four homogenous pluralities of cleaning bristles of the first color and the first specified length are able to perform their essential function of cleaning the tire of the vehicle; and
    wherein the third specified length is the minimum acceptable actual length.

2. The cylindrical rotary tire brush element with the integrated wear indicator of claim 1, wherein the at least three homogeneous pluralities of indicator bristles are a material consisting essentially of a polymer selected from a list of polyethylene ("PE"), polypropylene ("PP"), and nylon, together with a colorant.

3. The cylindrical rotary tire brush element with the integrated wear indicator of claim 1, wherein the at least six homogeneous pluralities of cleaning bristles of the first color and first specified length and the at least two homogeneous pluralities of cleaning bristles of the first color and the second specified length are a material consisting essentially of a polymer selected from a list of PE, PP, and nylon, together with a colorant.

4. The cylindrical rotary tire brush element with the integrated wear indicator of claim 3, wherein the first color is black.

5. The cylindrical rotary tire brush element with the integrated wear indicator of claim 4, wherein the second color is one of yellow, red, orange, and green.

* * * * *